United States Patent Office

3,660,340
Patented May 2, 1972

3,660,340
HALOGENATED HYDROCARBON MATERIALS AS
TACKIFIERS FOR SYNTHETIC RUBBERS
Sung Ki Lee, Niagara Falls, N.Y., assignor to Hooker
Chemical Corporation, Niagara Falls, N.Y.
No Drawing. Filed Nov. 30, 1966, Ser. No. 597,878
Int. Cl. C08c *11/24;* C08d *13/30*
U.S. Cl. 260—31.8 HA
17 Claims

ABSTRACT OF THE DISCLOSURE

Tackifying agents for rubbers, especially ethylene-propylene (EPDM and EPR) type rubbers, can be prepared by treating paraffinic and/or aromatic hydrocarbon process oils having at least ten carbon atoms with an alkylating or acylating or halogenating agent. Four methods of preparataion are given: (1) reaction of the hydrocarbon oil directly with an alkylation or acylation agent, such as polychlorinated benzyl chloride, in the presence of a Lewis acid, (2) halogenation of the hydrocarbon oil, (3) modification of a halogenated hydrocarbon oil into an alkylating agent, such as by treatment with chloromethyl ether in the presence of a Lewis acid, and then further reacted with a hydrocarbon oil, and (4) alkylation or acylation of a hydrocarbon oil, such as by treatment with benzyl chloride in the presence of a Lewis acid, and followed by halogenation.

---

This invention relates to alkylated hydrocarbon oils to be used as tackifying agents for rubbers, especially ethylene-propylene (EPDM and EPR) type rubbers, and to processes therefor.

Natural rubber has an inherent surface property known as "building tack" which enables two pieces of uncured (unvulcanized) stock to adhere together when brought in contact under very moderate pressures. After curing, the natural rubber does not have this building tack. However, synthetic rubbers vary in their ability to exhibit this inherent building tack and are generally deficient in this respect. Ethylene-propylene (EPDM and EPR) type rubbers have such a low degree of building tack that without added tackifying agents they cannot be used for many purposes. Presently available tackifiers do not permit the economical production of vehicle tires from EPDM and EPR rubbers.

It is an object of this invention, therefore, to provide a tackifying agent for synthetic rubbers in general, and especially for ethylene-propylene (EPDM and EPR) type rubbers.

It is a further object to provide a tackifying agent for rubbers which has an infinite compatibility with both the rubber being compounded and the oil being used with the rubber.

It is a further object to provide a tackifying agent for synthetic rubbers which is relatively easy to process into the rubber.

It is still a further object to provide a method for incorporating the tackifying agent into the rubber without the use of additional special equipment.

It is a further object to provide a tackifying agent for synthetic rubbers which at the same time permits the maintenance of the required physical properties.

It is still another object to provide a tackifying agent for rubbers which is inexpensive.

Still another object is to provide a tackifying agent which exhibits repeated tackifying properties upon aging; that is, a tackifying agent which does not exhibit a decline in tackifying properties with repeated use or over an extended period of time.

Still another object is to provide a tackifying agent for synthetic rubbers which exhibits the tackifying properties over a relatively wide range of temperature.

A further object is to provide a tackifying agent for uncured synthetic rubber which when cured does not exhibit building tack, similar to the properties of natural rubber.

It is a further object to provide a process for producing alkylated oils and also the product produced therefrom.

These and other objects are achieved by incorporation into the synthetic rubber of a modified hydrocarbon oil as the tackifying agent. For example, I have found the products resulting from catalyzed alkylations and acylations (or combinations of both reactions) of hydrocarbon process oils with polyhalogenated compounds can be used as resinous tackifiers for ethylene-propylene terpolymer rubbers and other synthetic rubbers. I have also found that other methods of preparing said modified hydrocarbon process oils, including halogenations and Lewis Acid catalyzed alkylations and acylations effected separately or together can be used to produce the tackifying compositions of this invention. It has been found that unobvious results can be achieved by the incorporation of such modified hydrocarbon resins in various synthetic rubber compositions such as EPDM, EPR, SBR, butyl rubber, nitrile rubber, and the like. The use of the materials of this invention is EPDM rubber formulations, for example, results in a marked increase in the building tack of the unvulcanized specimen; yet at the same time, subsequent curing leads to products which are no longer tacky and which have suffered little or no loss of physical properties, such as tensile strength, elongation and hardness. In fact, in many instances, an improvement in many of these properties can be effected. Furthermore, these modified hydrocarbon oils are substantially fully compatible with the original oil itself and with the ethylene-propylene terpolymer rubber. This characteristic has the added advantage of ease of processing.

It has also been found that halogenation of hydrocarbon oils provides modified oils which, when used as tackifiers, result in tack improvement, and the use of these resultant halogenated hydrocarbon oils is considered to be within the scope of this invention. Such materials can be made by the bromination, and/or chlorination and/or fluorination of said hydrocarbon oils according to procedures well known in the art.

In addition, the tackifying use of modified oils prepared by a combined process involving alkylation, acylation and/or halogenation, as described above, is also considered to be within the scope of the instant invention. For example, modified oils may be prepared by halogenating and then halomethylating an appropriately reactive oil, and finally, by reacting this halomethylated, halogenated oil with another reactive oil under Friedel-Crafts conditions. Such a reaction sequence may be run stepwise in separate reaction vessels or consecutively in the same vessel. Alternatively, a particular oil may first by alkylated with a material containing halomethyl-substituted aromatic compounds and this can then be halogenated to give an appropriately modified oil. It is apparent that various combinations of halogenation and alkylation and acylation procedures as well as various combinations and proportions of halogens, alkylating agents and acylating agents may be employed to yield tackifying materials within the scope of this invention.

The hydrocarbon oil to be converted into the tackifier of this invention has at least ten carbon atoms and is selected from paraffinic and aromatic (including naphthenic) oils, as well as mixtures of them. The terms aromatic, paraffinic and naphthenic, as used herein to describe the oils used in this invention, refer to a significant constituent of these oils with respect to the other components contained therein. For example, four typical petroleum oils used for the preparation of the tackifiers of this invention have the following physical properties and compositions:

PROPERTIES OF OIL

| | Types | | | |
|---|---|---|---|---|
| | Paraffinic, 1 | Naphthenic | | Aromatic, 4 |
| | | 2 | 3 | |
| Viscosity, SUS at 210 degrees Fahrenheit | 85 | 72 | 85 | 88 |
| Density, grams per milliliter | 0.83 | 0.93 | 0.95 | 0.98 |
| Aromatic content, weight percent | 23 | 32 | 49 | 77 |
| Carbon type analysis, percent: | | | | |
| Aromatic | 4 | 10 | 22 | 34 |
| Naphthenic | 28 | 42 | 40 | 32 |
| Paraffinic | 68 | 48 | 38 | 34 |

While it is preferred that oils of lower aromatic content be used because of economic and reaction considerations, any such process oil can be employed. Commercially available process oils are sold under the names of Flexon™ (Enjay), Circosol™ (Sunoco), Mobisol™ (Mobil), and the like.

The oil to be used is reacted with an alkylating or acylating agent as those defined by the formula:

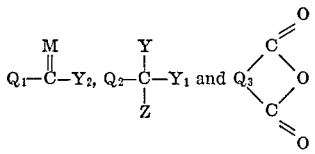

wherein $Q_1$ is selected from: an aromatic hydrocarbon group of from 6 to 30 carbon atoms, including phenyl, substituted phenyl (such as alkylphenyl wherein each alkyl group has from 1 to 18 carbon atoms (examples of which include tolyl, xylyl, propylphenyl), alkoxyphenyl wherein each alkoxy group has from 1 to 18 carbon atoms, nitrophenyl, halophenyl, nitrosophenyl, and the like), naphthyl, substituted naphthyl (such as alkyl naphthyl wherein each alkyl group has from 1 to 18 carbon atoms, alkoxy naphthyl wherein each alkoxy group has from 1 to 18 carbon atoms, nitronaphthyl, nitrosonaphthyl, halonaphthyl), anthryl, substituted anthryl (such as alkyl anthryl wherein each alkyl group has from 1 to 18 carbon atoms, alkoxy anthryl wherein each alkoxy group has from 1 to 18 carbon atoms, nitroanthryl, nitrosoanthryl, haloanthryl), and other polynuclear and substituted polynuclear aromatic groups, wherein the substituents thereon are the same as for phenyl; alkyl, straight chain and/or branched, saturated and/or unsaturated, of from 1 to 18 carbon atoms, substituted alkyl (such as alkoxy alkyl wherein each alkoxy group has from 1 to 18 carbon atoms, nitroalkyl, nitrosoalkyl, haloalkyl), alkyl polyoxypolymethylene (such as ROCH$_2$CHOCH$_2$CH— and

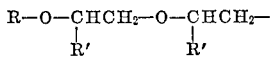

where R and R' are alkyl from 1 to 18 carbon atoms, and aryl polyoxypolymethylene

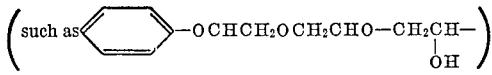

wherein $Q_2$ is selected from $Q_1$, aroyl (such as benzoyl, substituted benzoyl, such as alkyl benzoyl) wherein each alkyl group has from 1 to 18 carbon atoms, alkoxy benzoyl wherein each alkoxy group has from 1 to 18 carbon atoms, nitrobenzoyl, nitrosobenzoyl, halobenzoyl), naphthoyl, substituted naphthoyl (such as alkyl naphthoyl wherein each alkyl group has from 1 to 18 carbon atoms, alkoxy naphthoyl wherein each alkoxy group has from 1 to 18 carbon atoms, nitronaphthoyl, nitrosonaphthoyl, halonaphthoyl); alkanoyl having from 1 to 18 carbon atoms (such as acetyl, stearoyl, and the like); substituted alkanoyl (such as alkyl alkanoyl wherein each acyl group has from 1 to 18 carbon atoms, alkoxy alkanoyl wherein each alkoxy group has from 1 to 18 carbon atoms, nitro- alkanoyl, nitrosoalkanoyl, haloalkanoyl (such as chlorobutyl); alkenoyl having from 1 to 18 carbon atoms (such as acryloyl, cinnamoyl, and the like); alkynoyl having from 1 to 18 carbon atoms

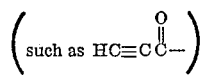

alkoxy carbonyl

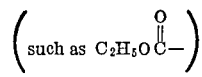

thioaroyl having 6 to 30 carbon atoms; alkanthioyl having from 1 to 18 carbon atoms; alkenthioyl having from 1 to 18 carbon atoms; alkoxythiocarbonyl wherein each alkoxy group has from 1 to 18 carbon atoms; wherein $Q_3$ is selected from 1,2-arylene wherein each aryl group has from 6 to 30 carbon atoms, substituted 1,2-arylene (such as alkyl arylene wherein each alkyl group has from 1 to 18 carbon atoms, alkoxy arylene wherein each alkoxy group has from 1 to 18 carbon atoms, haloarylene, nitroarylene, nitrosoarylene); 1,2-alkylene wherein each alkylene group has from 1 to 18 carbon atoms, substituted alkylene (such as alkylalkylene wherein each alkyl group has from 1 to 18 carbon atoms, alkoxyalkylene wherein each alkoxy group has from 1 to 18 carbon atoms, arylalkylene wherein each aryl group has from 6 to 30 carbon atoms, haloalkylene, nitroalkylene, nitrosoalkylene), 1,2-alkenylene having from 1 to 18 carbon atoms, substituted alkenylene (such as alkyl alkenylene wherein each alkyl group has from 1 to 18 carbon atoms, alkoxy alkenylene wherein each aryl group has from 6 to 30 carbon atoms, haloalkenylene, nitroalkenylene, nitrosoalkenylene), 1,2-cyclohexylene, substituted cyclohexylene (such as alkyl cyclohexylene wherein each alkyl group has from 1 to 18 carbon atoms, alkoxy cyclohexylene wherein each alkoxy group has from 1 to 18 carbon atoms, endo alkylidene wherein each alkylidene group has from 1 to 18 carbon atoms, substituted endo alkylidene cyclohexylene wherein the substituents are halogen and alkoxy of 1 to 18 carbon atoms, aryl, cyclohexylene wherein each aryl group has from 6 to 30 carbon atoms, halocyclohexylene, nitrocyclohexylene, nitrosocyclohexylene), 1,2-cyclohexyleneylene, substituted 1,2-cyclohexyleneylene (such as alkyl cyclohexyleneylene wherein each alkyl group has from 1 to 18 carbon atoms, alkoxy cyclohexyleneylene wherein each alkoxy group has from 1 to 18 carbon atoms, aryl cyclohexyleneylene wherein each aryl group has from 6 to 30 carbon atoms, halocyclohexyleneylene, nitrocyclohexyleneylene and nitrosohexyleneylene), 1,2-cyclopentylene, substituted cyclopentylene (such as alkyl cyclopentylene wherein each alkyl group has from 1 to 18 carbon atoms, alkoxy cyclopentylene wherein each alkoxy group has from 1 to 18 carbon atoms, aryl cyclopentylene wherein each aryl group has from 6 to 30 carbon atoms, halocyclopentylene, nitrocyclopentylene, nitrosocyclopentylene), bicycloheptenylene, and substituted bicycloheptenylene (such as alkyl bicycloheptenylene wherein each alkyl group has from 1 to 18 carbon atoms, alkoxy bicycloheptenylene wherein each alkoxy group has from 1 to 18 carbon atoms, aryl bicycloheptenylene wherein each aryl group has from 6 to 30 carbon atoms, and halobicycloheptenylene); wherein M is oxygen, sulfur, alkylidene of from 1 to 18 carbon atoms, and is straight chain or branched, aralkylidene of from 7 to 31 carbon atoms, alkylimino (R—N=) wherein the alkyl group has from 1 to 18 carbon atoms and is straight chain or branched, aralkylimino wherein the aralkyl group has from 7 to 31 carbon atoms and arylimino wherein the aryl group has from 6 to 30 carbon atoms; wherein X and Z are selected from $Q_2$, hydrogen, iodine, bromine, chlorine and fluorine; $Y_1$ is selected from iodine, bromine, chlorine, fluorine, hydroxy, mercapto, alkylidene of from 1 to 18 carbon atoms, branched or straight chain and aralkylidene of from 7 to 31 carbon atoms; alkynyl of from 1 to 18 carbon atoms and aralkynyl of from 8 to 32 carbon atoms, alkyl substituted methyleneimino (C=N—) wherein the alkyl group has from 1 to 18 carbon atoms, and aryl substituted methyleneimino (C=N—) wherein the aryl group has from 6 to 30 carbon atoms; and $Y_2$ is selected from chlorine, bromine, fluorine, iodine, hydroxy, mercapto, alkynyl of from 1 to 18 carbon atoms, alkyl carbonyloxy

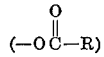

wherein R is alkyl of from 1 to 18 carbon atoms, branched or straight chain, alkenyl of from 1 to 18 carbon atoms, branched or straight chain, aralkyl of from 6 to 30 carbon atoms and aralkenyl of from 6 to 30 carbon atoms, alkyl carbonyl

wherein the alkyl group has from 1 to 18 carbon atoms, aryl carbonyl

wherein the aryl group has from 6 to 30 carbon atoms; and aryl carbonyloxy

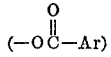

wherein Ar is as defined in $Q_2$. The halogens are selected from chlorine, bromine, fluorine and iodine.

Illustrative examples of the alkyl substituents, which usually contain from 1 to about 18 carbon atoms, are methyl, ethyl, propyl, isopropyl, butyl, isobutyl, amyl, hexyl, cyclohexyl, heptyl, octyl, nonyl, dodecyl, pentadecyl, stearyl, octadecyl, and the like, said alkyl group being a monovalent radical derivable from an aliphatic hydrocarbon by the removal of one hydrogen atom. The alkylene radicals can be similarly described, except that they are divalent radicals derivable from an aliphatic hydrocarbon by the removal of two hydrogen atoms, such as methylene, ethylene, and the like. The alkyl radical can be substituted by halogen, such as chlorine, bromine, fluorine or iodine, as in chloromethyl, dichloromethyl, trichloromethyl, trifluoromethyl, bromoethyl chloroethyl, fluoropropyl, hexachloroisopropyl, chlorobutyl, bromobutyl, chlorocyclohexyl, chloropropyl, bromooctyl, chlorooctyl, chlorodecyl, chlorododecyl, bromododecyl, bromopentadecyl, iodoamyl, and the like.

Illustrative examples of the alkenylene substituents, which usually contain from 1 to 18 carbon atoms, are ethenylene, propenylene, isopropenylene, butenylene, isobutenylene, pentenylene, hexenylene, cyclohexenylene, heptenylene, octenylene, nonenylene, dodecenylene, pentadecenylene, octadecenylene, and the like, said alkenylene group being a divalent radical derivable from an aliphatic hydrocarbon by removal of two hydrogen atoms. The alkenylene radical can be substituted by halogen, such as chlorine, bromine, fluorine and iodine, as in chloroethenylene, dichloroethenylene, trichloroethenylene, trifluoroethenylene, bromoethenylene, chloropropenylene, fluoropropenylene, hexachloroisopropenylene, chlorobutenylene, bromobutenylene, chlorocyclohexenylene, chloropentenylene, bromooctenylene, chlorooctenylene, chlorodecenylene, chlorododecenylene, bromododecenylene, bromopentadecenylene, iodopentenylene, and the like.

Among the alkenyl substituents which usually contain from 1 to about 18 carbon atoms, are vinyl, allyl, butenyl, hexenyl, octenyl, dodecenyl, and the like, said alkenyl group being a radical derivable from an alkene by the removal of one hydrogen atom. The alkenyl radical can be substituted by halogen, such as chlorine, bromine or fluorine, as in trichlorovinyl, 2-chloro-allyl, 2,3-difluorobutenyl, 2,3-dichlorododecnyl, 2-bromoallyl, and the like.

Typical aryl substituents, including aralkyl and alkaryl groups, which usually contain from 6 to about 30 carbon atoms, are phenyl, benzyl, tolyl, phenylethyl, xylyl, naphthyl, hexylphenyl, and the like, said aryl group being a monovalent radical derivable from an aromatic hydrocarbon by the removal of one hydrogen atom. The aryl radicals can be substituted by halogen, such as chlorine, bromine, and fluorine, as in p-chlorophenyl, p-bromophenyl, p-fluorophenyl, and the like.

Typical cycloalkyl substituents, which usually contain from 3 to about 12 carbon atoms, are cyclohexyl, cyclopropyl, cyclopentyl, cycloheptyl, cyclooctyl, and the like, said cycloalkyl group being a monovalent radical derivable from an aliphatic hydrocarbon by the removal of one hydrogen atom. The cycloalkyl radicals can be substituted by halogen, e.g., chlorine, bromine, and fluorine, as in chlorocyclohexyl, bromocyclopentyl, fluorocyclohexyl, and the like.

Additional examples of such agents are: benzyl chloride, benzophenone, acetophenone, toluyl alcohol, phenylbenzyl ketone, butyl-α-chloroethyl benzene, benzil, dichrlorobenzyl bromide, benzoyl acetone, trichlorobenzyl chloride, thioacetyl bromide, phenylbromobenzyl chloride, methyl vinyl ketone, methylethyl ketone, benzoyl chloride, benzoic acid, thiobenzoic acid, p-phenylbenzyl bromide, chloromethyl phenoxy benzyl sulfide, chloro-β-chloromethyl styrene, p-methyl-α-chlorostyrene, styrene, N-dichlorobenzylidene dodecylamine, N-phenacylidene methylamine, N-(2-phenylethylidene) aniline, dodecene-1, 1-chloro-2-phenylethane, octadecyl bromide, limonene, cyclohexene, methylnonylchloromethane, methylbenzyl ether, N-naphthylmethylene trichloroaniline, 4-chloro-1-(5-nitro-1-naphthyl) but-2-ene-1-one, bromobenzyl-nitrile-biphenyl, p-ethylphenyl-ethylmethyl-chloromethane, chloroisopropyl-vinyl ketone, nitrosobenzal chloride, 3-chlorododec-5-ene-2-one, reaction products of bisphenols and epoxides which have been terminated with epoxides like epichlorohydrin, for example, 2,2-bis [(3-chloro-2-hydroxy) propoxyethoxyethoxyphenyl]propane, fatty acid glycerides, such as linseed oil, tallow tung oil, and the like, carbobenzoyloxybutane, phthalic anhydride, tetrachlorophthalic anhydride, maleic anhydride, dichloromaleic anhydride and chlorendic anhydride.

The alkylation, acylation or halogenation reaction takes place in the presence of a catalyst therefor. The catalyst may be chosen from those known in the art, including Friedel-Crafts catalysts. Examples of these catalysts are $AlCl_3$, $AlBr_3$, $BF_3$ etherate, HCl, $H_2SO_4$, $SnCl_4$, aluminum chloride, metal salts such as lithium chloride, sodium chloride, potassium chloride, calcium chloride, antimony trichloride, zinc chloride, hydrogen fluoride, oxalic acid, titanium, copper, zinc, phosphorus pentoxide, alkoxy aluminum halides, metaborates, such as metaboric acid, stannic halides, zirconium halides, titanium halides, ferric halides, such as ferric chloride and ferric bromide, phosphates of metals, including metaphosphates, arsenates of metals, including acid sulfates, and the like.

Substitution halogenation (e.g., chlorination bromination) can be effected on non-aromatic carbon atoms by the use of free radical catalysts such as ultraviolet light. Flourination can be effected by catalysts such as $CoF_3$, $SbF_5$, $SbF_3$, $Cl_2$, $AgF_2$, HF in the presence of carbon, $ZrF_4$ on carbon, alumina, clay, and the like.

Equation 1 illustrates the preparation of the aralkylated oil when the alkylating agent is trichlorobenzyl chloride and the catalyst is $AlCl_3$:

(1)

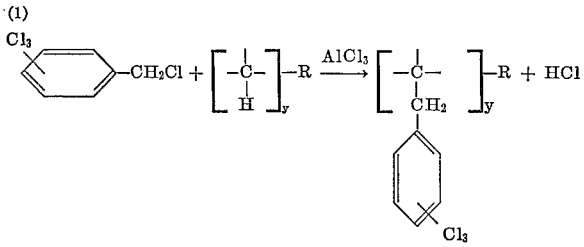

where $y$ is at least one, and R is the residue of the hydrocarbon oil.

The aromatic alkylation agent can also react with itself, provided positions are available, as illustrated in Equation 2:

(2) $Cl_3\phi-CH_2Cl + AlCl_3 \rightarrow$
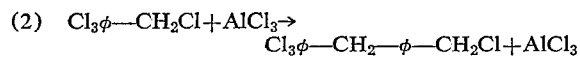
$Cl_3\phi-CH_2-\phi-CH_2Cl + AlCl_3$ where $\phi$ is a benzene ring.

This reaction can proceed further so that the alkylating agent can be of the type as illustrated by Equation 3:

(3)
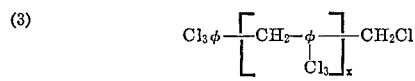

where $x$ is 1 to 10.

While the above illustrations show the use of trichlorobenzyl chloride, other alkylating agents can be employed as has hereinbefore been described.

Typical polychlorobenzyl chlorides used for the preparation of tackifiers of this invention have the following general composition:

| Sample | 1 | 2 | 3 |
|---|---|---|---|
| Monochlorobenzyl chloride | 0.1 | 0.1 | 0.1 |
| 2,5-dichlorobenzyl chloride | 3.4 | 5.4 | 5.8 |
| 2,6-dichlorobenzyl chloride | 1.5 | 2.3 | 3.2 |
| 2,4-dichlorobenzyl chloride | 1.7 | 2.6 | 3.2 |
| 3,4-dichlorobenzyl chloride | 0.7 | 1.0 | 1.2 |
| 2,4,6-trichlorobenzyl chloride | 4.6 | 4.9 | 4.7 |
| 2,3,6-trichlorobenzyl chloride | 59.1 | 55.8 | 54.7 |
| 2,4,5-trichlorobenzyl chloride | 20.2 | 20.6 | 20.2 |
| 2,3,4-trichlorobenzyl chloride | 7.8 | 7.0 | 6.7 |
| 2,4,5,6-tetrachlorobenzyl chloride | 0.9 | 0.4 | 0.3 |
| 2,3,4,5-tetrachlorobenzyl chloride | 0.1 | 0.1 | 0.1 |
| Other isomeric chlorobenzal trichlorides | 1.0 | 1.0 | 1.0 |
| Other isomeric chlorobenzo trichlorides | 1.0 | 1.0 | 1.0 |

Equation 4 illustrates the preparation of the alkylated oil where the alkylating agent is trichlorobenzyl alcohol and the catalyst is sulfuric acid:

(4)
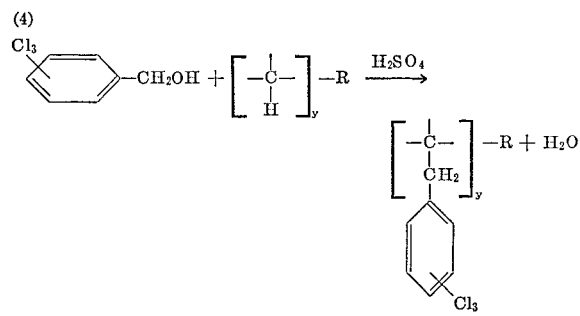

where $y$ is the same as above.

The rubbers to be tackified within the scope of this invention include the ethylene-propylene rubbers, the butyl rubbers, the nitrile rubbers, the styrene butadiene rubbers, and the polybutadiene rubbers. The ethylene-propylene copolymer rubbers have at least 20 percent of ethylene or propylene polymerized therein and can have a small amount of another diethylenically unsaturated monomer polymerized therewith. Such monomers include chloroprene, 1,3-pentadiene, isoprene, 1,3-butadiene, dicyclopentadiene, 1,6-hexadiene, and the like, including especially nonconjugated dienes as are already described in the art. The rubbers can also be in admixture with other known polymeric materials including other rubbers. The preferred terpolymers generally contain from 1 to 10 percent of the diene component such as cyclopentadiene, 1,3-butadiene, chloroprene, or isoprene. While these materials have many outstanding properties, their tack and therefore their adhesion to themselves and to other materials such as textiles, other rubbers and metals is poor.

The term "butyl rubber" refers to vulcanizable hydrocarbon polymers having a low degree of unsaturation; it can be prepared by the copolymerization of isobutylene with a few percent of a doubly unsaturated material such as isoprene. Such materials currently often require the addition of tackifiers (such as, currently oil soluble resins of low unsaturation) in order to increase their tack.

The styrene-butadiene rubbers are prepared by the copolymerization of styrene and butadiene in varying ratios (typically about 29/71) and have been and are known as GR–S rubbers. The building tack of these materials is notoriously poor and tackifiers are required in order to obtain satisfactory processing.

The polybutadiene rubbers are prepared by the polymerization of butadiene, preferably by the use of stereospecific catalysts. Nitrile rubber can be prepared by copolymerizing two monomers, a diene and an unsaturated nitrile such as butadiene and acrylonitrile.

The amount of tackifying agent to be used in the rubber composition depends upon the ultimate use of the rubber. A tackifying amount should be used, that is, one which increases the tack of the rubber employed to a practical level.

In general, however, the amount of tackifier to be used is within a range from between about 2–3 parts by weight to about 100 parts by weight per hundred parts by weight of the elastomeric material used.

The tackifier of this invention may be incorporated into the rubber by conventional blending means known in the art. Such blending can be achieved by stirring, mixing, milling, grinding, and the like.

Mixtures of tackifiers can be used in accordance with the present invention as well. These tackifiers are prepared by reacting hydrocarbon oils with the defined compositions in the presence of a catalyst in accordance with the teaching of this invention. Other tackifiers can also be used. These mixtures may be prepared by physically mixing different tackifiers together and then admixing them with the rubber, or they may be individually mixed with the rubber.

The rubber to be tackified by this invention may contain other normal rubber additives, including pigments, fillers, vulcanizers, accelerators, stabilizers, oxidation inhibitors, and the like, which have been or are employed in the field of rubber technology. The rubber to be tackified may also be in admixture with other known rubbers in the art.

The following examples are intended only to illustrate the invention, no limitation of the scope is intended thereby. Unless otherwise indicated, all parts and percentages are by weight, and temperatures are in degrees centigrade.

EXAMPLE 1

This example illustrates a typical method for preparing tackifier composition comprising reacting a hydrocarbon oil with a polychlorinated benzyl chloride.

To a reaction flask were charged 1000 grams of hydrocarbon oil (the term "hydrocarbon oil" refers to oils that are suitable for use in synthetic elastomers and includes the complete spectrum of petroleum oils that range from highly paraffinic to naphthenic and to aromatics of all possible ranges of mixed compositions which are thermally stable at 150–250 degrees centigrade and any of these may be employed). To this oil was added 2 percent by weight of anhydrous aluminum chloride (any of several Lewis acids which are effective for Friedel-Crafts alkylation may be used). The mixture was heated to 150 degrees centigrade and 300 grams of polychlorinated benzyl chloride were slowly added. (The polychlorinated benzyl chloride here referred to encompasses all the different possible isomers of mono-, di-, tri- and tetra-benzyl halides.) The reaction mixture was heated to 200 degrees centigrade and maintained at this temperature for 24 hours, during which time most of the hydrogen chloride gas was released. At the end of this time, the reaction mixture was poured into a large volume of cold water and the unreacted aluminum chloride and its complexes were hydrolyzed. The oil was separated and the remaining water and other solvents were stripped off to give a resinous oil compound which is suitable for tackifier compositions.

EXAMPLE 2

To a reaction flask were charged 300 grams of hydrocarbon oil, 20 grams of styrene and 3 grams of sulfuric acid with 0.5 gram of aluminum sulfate; and 50 grams of trichlorobenzyl chloride were then added. The mixture was heated to 150–200 degrees centigrade for 15 hours. At the end of the reaction, the reaction mixture was washed with water and dehydrated at 150 degrees centigrade under reduced pressure to give a viscous oil. The product contained 5–50 percent chlorine.

EXAMPLE 3

To a reaction flask were charged 300 grams of hydrocarbon oil (which contained 19 percent aromatic, 40 percent naphthenic and 41 percent paraffinic carbon atoms) and 5 grams of anhydrous aluminum chloride. The mixture was heated to 150 degrees centigrade. At this temperature, 100 grams of trichlorobenzyl chloride were added dropwise over a period of 5 hours. To this mixture 10 grams of linseed oil were added and the reaction temperature was raised to 200 degrees centigrade for an additional 15 hours to give a dark viscous oil.

EXAMPLE 4

To a reaction flask were charged 200 grams of hydrocarbon oil (which contained 19 percent aromatic, 40 percent naphthenic and 41 percent paraffinic carbon atoms), 2 grams of zinc chloride and 5 grams of Nuodex (zinc naphthenate) (6 percent), and 50 grams of linseed oil were then added. The reaction mixture was heated to 150–200 degrees centigrade for 8 hours. Then, 50 grams of trichlorobenzyl chloride were added dropwise to the reaction vessel, and the reaction temperature was maintained for an additional 8 hours at 200–220 degrees centigrade to give a viscous resin.

EXAMPLE 5

To a reaction flask were charged 350 grams of process oil, 15 grams of aluminum sulfate and 20 grams of sulfuric acid. Then, 115 grams of dicyclopentadiene were added dropwise to the reaction vessel. The exotherm started and the temperature rose 20 degrees centigrade during the period of addition. After the addition was completed, the reaction temperature was raised to 180–190 degrees centigrade and 100 grams of trichlorobenzyl chloride were added dropwise and the reaction mixture maintained at this temperature for 15 hours to give a viscous resin.

EXAMPLE 6

Evaluation of tickifier compositions on EPT rubber

The tackifier compositions prepared and described previously were evaluated in various synthetic rubber systems using a hand test. The hand test consists of pressing together two strips of the compounded elastomers, then pulling them apart manually and judging the force required to separate them. This was repeated on the same sample for several times at suitable intervals to obtain an estimate of repeat tack. All the samples were tested one to two days after milling and in some cases one week after milling. Commercially available mixed phenol-formaldehyde novolac-type tackifiers were used as control samples.

Evaluation procedure.—An EPT rubber composition was prepared which had formulations listed in Table I. A conventional two roll mill was preheated to a temperature of 300 degrees Fahrenheit (149 degrees centigrade); rubber and carbon flasks were milled for 10–15 minutes, then oil was added, and the resultant mixture milled for 10 minutes.

The roll temperautre was lowered to 116 degrees centigrade (240 degrees Fahrenheit), after which the calculated amount of tackifier composition was added and milling continued for 10–15 minutes. The remaining vulcanizing agents as well as accelerators were added to the rubber, and milling was continued for 5 minutes to give smooth, shiny surfaced rubber sheets which were about one-eighth inch thick. The sheeted samples were stored between liner cloths overnight and evaluated for tack by one or more of the following tests.

Test A.—Tack assessment was made by pressing two strips of elastomer composition and then pulling them apart manually and judging the force required to separate them.

Test B.—The above samples were aged one to three weeks at exposure to room temperature without protection. Then the aged sample surfaces were refreshed with solvents such as naphtha or silicone and after the solvent evaporated, Test A was repeated and the assessment was made.

Test C.—About one-quarter inch thick compounded stock was cut with a sharp knife and the edges were pressed together and set for one hour at room temperature. The fusion of edges was checked manually by attempting to pull the stock apart at the original cut.

The results which were obtained are summarized in Table I.

TABLE I.—EFFECTS OF TACKIFIER IN RUBBER COMPOSITION FORMULATIONS EVALUATION IN THREE DIFFERENT ETHYLENE-PROPYLENE DIENE TERPOLYMER RUBBERS

| Type of EPDM rubber/parts | Samples | | | Controls | | | | | |
|---|---|---|---|---|---|---|---|---|---|
| | Royalene 301/25.0 | Nordel 1070/25.0 | Enjay 4505/25.0 | Royalene/25.0 | | Nordel/25.0 | | Enjay/25.0 | |
| Components: | | | | | | | | | |
| HAF carbon black | 17.50 | 17.50 | 17.50 | 17.50 | | 17.50 | | 17.50 | |
| Stearic acid | 0.25 | 0.25 | 0.25 | 0.25 | | 0.25 | | 0.25 | |
| Zinc oxide | 1.25 | 1.25 | 1.25 | 1.25 | | 1.25 | | 1.25 | |
| Sulfur | 0.375 | 0.375 | 0.375 | 0.375 | | 0.375 | | 0.375 | |
| Mercapto benzothiazole | 0.125 | 0.125 | 0.125 | 0.125 | | 0.125 | | 0.125 | |
| Methyl zymate (zinc dimethyl dithiocarbomate) | 0.375 | 0.375 | 0.375 | 0.475 | | 0.375 | | 0.375 | |
| Flexon 580 oil [1] | None | None | None | 10 | 10 | 10 | 10 | 10 | 10 |
| Tackifier (see Example 6) | 12.50 | 12.50 | 12.50 | None | [2] 10 | None | [2] 10 | None | [2] 10 |
| Tack (after three days) | [3] | [4] | [4] | None | [5] | None | [5] | None | [5] |
| Relative tack [6] | 10 | 9 | 9 | | 2 | | 3 | | 2 |
| Cure temperature (degrees centigrade) | 160 | 160 | 160 | 160 | 160 | 160 | 160 | 160 | 160 |
| Cure time (minutes) | 30 | 30 | 30 | 30 | 30 | 30 | 30 | 30 | 30 |
| Tackiness after cure | None | None | None | | [7] | | [7] | | None |
| Shore hardness | 72 | 64 | 64 | 71 | 70 | 63 | 63 | 70 | 70 |
| Tensile strength | 2,644 | 3,032 | 2,373 | 2,680 | 2,530 | 2,440 | 1,270 | 2,510 | 2,400 |
| Elongation (percent) | 700 | 600 | 600 | 550 | 550 | 500 | 700 | 376 | 376 |

[1] Enjay hydrocarbon oil.
[2] A commercially available phenolic resin based tackifier.
[3] Excellent.
[4] Very good.
[5] Poor.
[6] On a scale of 10, with 10 being high.
[7] Slight.

Examples 7 and 8 illustrate other typical methods of modifying process oils by halogenation.

EXAMPLE 7

To a reaction flask were charged 300 grams of hydrocarbon oil which contained mixed composition of aromatic, naphthenic and paraffinic components. The oil was photochlorinated in the usual manner to give a product containing 5 to 40 percent chlorine. The product was evaluated for the tackifier as described above and satisfactory results were obtained.

EXAMPLE 8

To a reaction flask were charged 300 grams of hydrocarbon oil which contained mixed compositions of aromatic, naphthenic and paraffinic components, and 80 grams of solid silver difluoride (AgF$_2$) were added. The mixture was heated up to 190 degrees centigrade for three hours ot give a viscous resin. After the reaction mixture was worked up in the usual manner, the product was isolated and found to contain 10–20 percent fluorine. The product obtained was subjected to the tackifier evaluation described above, and satisfactory results were obtained.

EXAMPLE 9

To a reaction flask were charged 1000 grams of hydrocarbon oil, 20 grams of maleic anhydride and 20 grams of anhydrous aluminum chloride were added. The reaction mixture was slowly heated to 150 degrees centigrade, then there was added to this a mixture of 380 grams of polychlorobenzyl chloride and 20 grams of benzyl chloride over a period of four hours. At the end of the addition, the temperature of reaction was raised to 200–210 degrees centigrade for 24 hours, and the reaction product was worked up in the manner of Example 1.

EXAMPLE 10

To a reaction flask were charged 500 grams of hydrocarbon oil, 10 grams of maleic anhydride, and 20 grams of concentrated sulfuric acid were added. The reaction mixture was slowly heated to 100 degrees centigrade, then there was slowly added a mixture of 120 grams of polychlorobenzyl alcohol and 20 grams of benzyl alcohol. At the end of the reaction, the temperature of reaction was raised to 200 degrees centigrade, then kept at this temperature for a period of 24 hours. The reaction mixture was then cooled to 50 degrees centigrade, the contents were then poured into a large volume of water and washed to remove the acid until the organic phase became neutral. The product was isolated as in Example 1 and tested for tackification qualities.

EXAMPLE 11

To a reaction flask were charged 300 grams of hydrocarbon oil (which contained about 19 percent aromatic, 40 percent naphthenic and 41 percent paraffinic carbon atoms) and 5 grams of anhydrous aluminum chloride. The reaction mixture was heated to 100 degrees centigrade, then there were slowly added 100 grams of p-chlorobenzyl chloride over a period of three hours. The reaction temperature was raised to 200 degrees centigrade at the end of addition, and kept at this temperature for a period of 15 hours to give dark viscous solution. The product was isolated in accordance with Example 1 and tested for tackifying properties as described in Example 6 and found to have tack.

EXAMPLE 12

To a reaction flask were charged 300 grams of hydrocarbon oil which contained 10 percent aromatic material, 40 percent paraffinic material and 50 percent naphthenic material. Then, 5 grams of concentrated sulfuric acid were added. To this reaction mixture were added 100 grams of p-bromobenzaldehyde and the reaction temperature was raised to 100 degrees centigrade for three hours, then the reaction mixture was raised to 200 degrees centigrade for 20 hours to give dark viscous solution which was worked up as in Example 1 and tested for tack as described above.

EXAMPLE 13

To a reaction flask were charged commercial grade rubber process oil, 300 grams, and 10 grams of concentrated sulfuric acid. To this, 100 grams of p-chlorobenzyl sulfide were added. The reaction mixture was heated to 150–200 degrees centigrade for 20 hours to give viscous solution. The reaction mixture was worked up as in Example 1 and tested for tack as described above.

Example 14 illustrates a third method of preparing the tackifying oil of the invention, wherein a halogenated hydrocarbon oil is modified into an alkylating agent and then further reacted with hydrocarbon oil.

EXAMPLE 14

To a reaction flask was charged a chlorine-containing hydrocarbon oil, 300 grams. To this were added 30 grams of chloromethyl ether and 30 grams of zinc chloride. The reaction mixture was stirred at room temperature for 24 hours. At the end of the reaction, there were added 300 grams of hydrocarbon oil which contained 20 percent aromatic, 40 percent naphthenic and 40 percent paraffinic hydrocarbon, and the reaction temperature was slowly raised to 200 degrees centigrade over a period of 10 hours and maintained at this temperature for another 10 hours to give a dark viscous solution. The product was worked up and tested for tack as described in Examples 1 and 6.

EXAMPLE 15

To a reaction flask were charged 300 grams of hydrocarbon oil and 100 grams of chlorendic anhydride. Then, 20 grams of aluminum chloride were added to the mixture, and the temperature was slowly raised to 200 degrees centigrade for 20 hours to give a dark viscous solution. The product was worked up and tested for tack as described in Examples 1 and 6.

EXAMPLE 16

Using the manner described in Example 13, 300 grams of hydrocarbon oil and 100 grams of chloromaleic anhydride were subjected to reaction and the product worked up and tested for tack as described in Examples 1 and 6.

EXAMPLE 17

Evaluation in ethylene-propylene-diene terpolymer rubber

An ethylene-propylene-diene terpolymer rubber composition was prepared having the following formulations:

FORMULATION I

| | Parts |
|---|---|
| Ethylene-propylene-diene terpolymer rubber having a Mooney viscosity (ML–4 at 212 degrees Fahrenheit) of 88, a specific gravity of 0.85 and an iodinic number of 10 (trade name: Nordel 1070, manufactured by Du Pont. "Nordel" is a registered trademark) | 100 |
| Zinc oxide | 5 |
| Stearic acid | 1 |
| High-abrasion furnace (HAF) carbon black | 70 |
| Petroleum oil | 20 |
| Sulfur | 1.5 |
| 2-mercaptobenzothiazole (also known in the trade as "MBT") | 0.5 |
| Tetramethylthiuram monosulfide (having the trade name "Monex") | 1.5 |
| Tackifier | 40 |

FORMULATION II

| | Parts |
|---|---|
| Ethylene-propylene-diene terpolymer rubber having a Mooney viscosity (ML–4 at 212 degrees Fahrenheit) of 140, a specific gravity of 0.87 and iodine number of 10 (trade name: Royalene 200, manufactured by U.S. Rubber Company) | 100 |
| High abrasion furnace (HAF) carbon black | 60 |
| Stearic acid | 1 |
| Petroleum oil | 20 |
| Zinc oxide | 5 |
| 2-mercaptobenzothiazole | 0.5 |
| Tetramethylthiuram monosulfide | 1.5 |
| Sulfur | 1.5 |
| Tackifier | 40 |

A masterbatch was prepared in a Banbury mill which was preheated to 150 degrees centigrade and rubber, zinc oxide, stearic acid, carbon black, petroleum oil and rubber tackifier were blended for a period of seven minutes. To this, sulfur, 2-mercaptobenzothiazole and tetramethylthiuram bonosulfide were blended for two minutes. This rubber composition was charged to a two roll mill, adjusted to one-eight of an inch and was sheeted off and cut into specimens for evaluation.

The results of the evaluations are given for ethylene-propylene-diene terpolymer rubber in Formulations I and II in Table II and Table III.

FORMULATION III

| | Parts |
|---|---|
| Ethylene-propylene-diene terpolymer rubber having a Mooney viscosity (ML-4 at 212 degrees Fahrenheit) of 140, a specific gravity of 0.87 and iodine number of 10 (trade name: Royalene 200, manufactured by U.S. Rubber Company) | 100 |
| High abrasion furnace (HAF) carbon black | 60 |
| Stearic acid | 1 |
| Petroleum oil | 10 |
| Zinc oxide | 5 |
| 2-mercaptobenzothiazole | 1.0 |
| Tetramethylthiuram monosulfide | 3.0 |
| Sulfur | 3.0 |
| Tackifier | 50 |

TABLE II.—TACKIFIER STUDY IN EPT NORDEL 1070 RUBBER

Oil extenders:
  Circosol 4240
  Enjay Flexon 580
Tackifiers:
  Tackifier A [1]
  Tackifier B [1]

| Banbury masterbatch mixes | A | B | C | D | E | F | G | H | J | K | L | M | N | P | Q | R |
|---|---|---|---|---|---|---|---|---|---|---|---|---|---|---|---|---|
| Nordel 1070 | 100 | 100 | 100 | 100 | 100 | 100 | 100 | 100 | 100 | 100 | 100 | 100 | 100 | 100 | 100 | 100 |
| Stearic acid | 1 | 1 | 1 | 1 | 1 | 1 | 1 | 1 | 1 | 1 | 1 | 1 | 1 | 1 | 1 | 1 |
| Zinc oxide | 5 | 5 | 5 | 5 | 5 | 5 | 5 | 5 | 5 | 5 | 5 | 5 | 5 | 5 | 5 | 5 |
| HAF carbon black | 100 | 85 | 100 | 60 | 70 | 80 | 90 | 100 | 85 | 100 | 60 | 70 | 80 | 90 | 100 | 85 |
| Circosol 4240 [2] | 24 | 30 | 40 | 10 | | 15 | 10 | 24 | 30 | 40 | 10 | | 15 | 10 | 24 | 30 |
| Tackifier A | 50 | 50 | 50 | 50 | 50 | 50 | 50 | 50 | 50 | 50 | 50 | 50 | 50 | 50 | 50 | 50 |
| | 180 | 171 | 296 | 226 | 226 | 251 | 256 | 280 | 271 | 296 | 226 | 226 | 251 | 256 | 280 | 271 |
| 4′ Mooney 212° F | 90 | 63 | 66 | 67 | 90 | 78 | 95 | 89 | 64 | 65 | 65 | 90 | 79 | 101 | 86 | 64 |
| Ratio HAF/tack and oil | 1.35 | 1.06 | 1.11 | 1 | 1.4 | 1.23 | 1.5 | 1.35 | 1.06 | 1.11 | 1 | 1.4 | 1.23 | 1.5 | 1.1 | 1.06 |
| Tack: | | | | | | | | | | | | | | | | |
| 1 week—Solvent wipe | [3] | [3] | [3] | [3] | [3] | [3] | [3] | [3] | [3] | [3] | [3] | [3] | [3] | [3] | [3] | [3] |
| 1 week—No solvent | Good | Fair | [4] | Poor | Poor | Good | [4] | Good | Good | Good | [4] | Poor | [5] | Poor | Good | Good |

[1] Tackifier A refers to material prepared according to Example 1 using a mixture of naphthenic and paraffinic hydrocarbon oils (also containing lesser amounts of aromatic material). Tackifier B refers to material prepared according to Example 1 using a hydrocarbon oil classified as a paraffinic oil, which contains some naphthenic as well as aromatic hydrocarbon oils.
[2] Oil extender.
[3] Very good.
[4] Fair-good.
[5] Poor-Fair.

TABLE III.—PHYSICAL PROPERTIES ON STOCKS WITH MOONEY RANGE FORMULATIONS FROM TABLE II

| | B | C | D | R |
|---|---|---|---|---|
| Nordel 1070 | 100 | 100 | 100 | 100 |
| Stearic acid | 1 | 1 | 1 | 1 |
| Zinc oxide | 5 | 5 | 5 | 5 |
| HAF carbon black | 85 | 100 | 60 | 85 |
| Circosol 4240 | 30 | 40 | 10 | |
| Tackifier | 50 | 50 | 50 | |
| Flexon 580 | | | | 30 |
| Tackifier B | | | | 50 |
| Total | 271 | 296 | 226 | 271 |
| Sulfur | 1.5 | 1.5 | 1.5 | 1.5 |
| Monex | 1.5 | 1.5 | 1.5 | 1.5 |
| MBT | 0.5 | 0.5 | 0.5 | 0.5 |
| Grand total | 274.5 | 299.5 | 229.5 | 274.5 |

| | Cure | M100 | M500 | T | E | Shore | Percent set at break |
|---|---|---|---|---|---|---|---|
| B | 25′/307° F | 160 | 965 | 2,415 | 795 | 64-57 | 48 |
|   | 40′/307° F | 165 | 1,155 | 2,405 | 760 | 64-59 | 40 |
| C | 25′/307° F | 155 | 955 | 1,975 | 760 | 61-47 | 55 |
|   | 40′/307° F | 17. | 1,165 | 2,115 | 745 | 67-61 | 51 |
| D | 25′/307° F | 155 | 810 | 2,36 | 750 | 63-57 | 35 |
|   | 40′/307° F | 170 | 1,010 | 2,425 | 720 | 63-59 | 31 |
| R | 25′/307° F | 160 | 1,020 | 2,060 | 735 | 64-56 | 45 |
|   | 40′/307° F | 170 | 1,180 | 2,070 | 685 | 66-60 | 35 |

NOTE:

| | 90 percent cross links | 70 percent cross links |
|---|---|---|
| Curometer at 150° C.: | | |
| B | 35 minutes | 23 minutes |
| C | 40 minutes | 21 minutes |
| D | 38 minutes | 23 minutes |
| R | 36½ minutes | 21 minutes |

A masterbatch was prepared in a Banbury mill which was preheated to 150 degrees centigrade and rubber, zinc oxide, stearic acid, carbon black, petroleum oil and rubber tackifier were blended for a period of seven minutes. To this, sulfur, 2-mercaptobenzothiazole and tetramethylthiuram monosulfide were blended for two minutes. This rubber composition was charged to a two roll mill, adjusted to one-eighth of an inch and was sheeted off and cut into specimens for evaluation.

The results of the evaluations are given for ethylene-propylene-diene terpolymer rubber in Formulation III in Table IV.

TABLE IV.—PHYSICAL PROPERTIES ON STOCKS WITH 65 MOONEY RANGE

| | B | C | D | R |
|---|---|---|---|---|
| Nordel 1070 | 100 | 100 | 100 | 100 |
| Stearic acid | 1 | 1 | 1 | 1 |
| Zinc oxide | 5 | 5 | 5 | 5 |
| HAF carbon black | 85 | 100 | 60 | 85 |
| Circosol 4240 | 30 | 40 | 10 | |
| Tackifier | 50 | 50 | 50 | |
| Flexon 580 | | | | 50 |
| Tackifier B | | | | 50 |
| Total | 271 | 296 | 226 | 271 |
| Sulfur | 3.0 | 3.0 | 3.0 | 3.0 |
| Monex | 3.0 | 3.0 | 3.0 | 3.0 |
| MBT | 1.0 | 1.0 | 1.0 | 1.0 |
| Grand total | 278.0 | 303.0 | 233.0 | 278.0 |

| | Cure | M300 | M500 | T | E | Shore | Percent set at break |
|---|---|---|---|---|---|---|---|
| B | 40′/307° F | 890 | 1,753 | 2,523 | 652 | 64-59 | 47.5 |
| C | 40′/307° F | 866.7 | 1,667 | 2,115 | 575 | 67-61 | 40 |
| D | 40′/307° F | 720 | 1,470 | 2,425 | 622 | 63-59 | 40 |
| R | 40′/307° F | 822.7 | 1,628 | 1,900 | 558 | 66-60 | 37 |

EXAMPLE 18

Evaluation in styrene-butadiene rubber

Styrene-butadiene rubber compositions were prepared in a similar manner to that described for the evaluations for the ethylene-propylene-diene terpolymer. The formulations and results are as shown in Table V:

TABLE V

Evaluation of tackifiers in styrene-butadiene rubbers

| | Parts |
|---|---|
| Styrene-butadiene rubber (25 percent styrene, 75 percent butadiene) | 100 |
| High abrasion furance black | 50 |
| Zinc oxide | 5 |
| Stearic acid | 2 |
| Phenyl-β-naphthylamine | 1.5 |
| Sulfur | 2 |
| Petroleum oil | 5 |
| Tackifier | 10 |

Tack

Test A: 1 week—good
Test B: 1 week—good
Test C: 1 week—good

| | |
|---|---|
| Tensile strength | 2484 |
| Elongation | 450 |
| Shore hardness | 68 |

EXAMPLE 19

Evaluation in ethylene-propylene rubber

An ethylene-propylene rubber composition was prepared in a similar manner to that described above. The formulations and results are shown in Table VI:

TABLE VI

Evaluation of tackifier in ethylene-propylene copolymer rubber

| | Parts |
|---|---|
| Ethylene-propylene rubber (40 percent ethylene, 60 percent propylene Mooney viscosity of 35–49 at 212 degrees Fahrenheit (8 minutes), specific gravity 0.86 | 100 |
| High abrasion furnace black | 60 |
| Petroleum oil | 10 |
| Zinc oxide | 5 |
| 40 percent dicumyl peroxide | 27 |
| Sulfur | 0.3 |
| Tackifier A | 10 |

Tack

Test A: 1 week—good
Test B: 1 week—good
Test C: 1 week—good

EXAMPLE 20

Evaluations in butyl rubber

A butyl rubber composition having the following formulations was prepared in a similar manner to that described above and the tack was evaluated in a similar manner. The results are shown in Table VII:

TABLE VII

Evaluation of tackifiers in butyl rubber compositions

| | Parts |
|---|---|
| Butyl rubber (97 percent isobutylene, 3 percent isoprene) | 100 |
| High abrasion carbon black | 50 |
| Petroleum oil | 20 |
| Zinc oxide | 5 |
| Stearic acid | 2 |
| Sulfur | 2 |
| Tackifier A | 10 |
| 2-methylbenzylthiazole | 1 |

Tack

Test A: 1 week—good
Test B: 1 week—good
Test C: 1 week—good

Example 21 illustrates a fourth method of preparing the tackifying oil of this invention wherein a process oil is modified by alkylation or acylation and subsequently halogenated.

EXAMPLE 21

To a reaction flask were charged 300 grams of hydrocarbon oil and 30 grams of ferric chloride. Then, 150 grams of benzyl chloride were added slowly at a temperature of between 100 and 150 degrees centigrade for two hours. At the end of the addition, the reaction mixture was heated and stirred for three hours at a temperature of 150 to 200 degrees centigrade and the reaction cooled. 100 grams of hydrocarbon oil was added and the mixture was chlorinated after the manner of Example 7. The product was worked up and isolated in a manner as described in Example 7 and tackification properties were determined as shown in Example 6.

The acylated or alkylated or halogenated oil compositions of this invention may also be used to modify other elastomeric polymer compounding formulation compositions.

Various changes and modifications may be made and equivalents may be substituted in this invention, certain preferred forms of which have been described, without departing from the scope of this invention.

I claim:

1. A composition capable of being cured comprising an elastomeric polymer and from about 2 to about 100 parts by weight per hundred parts by weight of said polymer of the halogen-containing product from the catalyzed reaction of a petroleum hydrocarbon oil with an organic halogen-containing alkylation agent or an organic halogen-containing acylation agent; said hydrocarbon oil having at least 10 carbon atoms and selected from a paraffinic oil, a naphthenic oil, an aromatic oil and mixtures thereof; the components of said product being in the weight ratio of about 0.9 to 6 parts of said hydrocarbon oil per part of said alkylation agent or acylation agent, and said product containing at least 5% halogen.

2. The composition of claim 1 wherein the elastomeric polymer is an ethylene-propylene terpolymer rubber.

3. The composition of claim 1 wherein the elastomeric polymer is ethylene-propylene rubber.

4. The composition of claim 1 wherein the elastomeric polymer is a styrene-butadiene rubber.

5. The composition of claim 1 wherein the elastomeric polymer is butyl rubber.

6. The composition of claim 1 wherein the elastomeric polymer is nitrile rubber.

7. The composition of claim 1 wherein the alkylation or acylation agent is polychlorobenzyl chloride.

8. The composition of claim 1 wherein the alkylation or acylation agent is polychlorobenzyl alcohol.

9. The composition of claim 1 wherein the alkylation or acylation agent is polychlorobenzoyl chloride.

10. The composition of claim 1 wherein the alkylation or acylation agent is chlorobenzyl sulfide.

11. The composition of claim 1 wherein the alkylation or acylation agent is bromobenzaldehyde.

12. The composition of claim 1 wherein the alkylation or acylation agent is chloromaleic anhydride.

13. The composition of claim 1 wherein the alkylation or acylation agent is chlorendic anhydride.

14. The composition of claim 1 wherein the tackifying agent is a product of treating hydrocarbon oil with a halogenated hydrocarbon oil modified into an alkylation agent.

15. The composition of claim 14 wherein the hydrocarbon oil is treated with a chlorinated oil which has been treated with halomethyl ether in the presence of a Lewis acid.

16. The composition of claim 1 wherein the tackifying agent is the product of alkylation or acylation of the hydrocarbon oil in the presence of a Lewis acid, followed by halogenation.

17. The composition of claim 16 wherein the alkylation or acylation agent is benzyl chloride.

References Cited

UNITED STATES PATENTS

| | | | |
|---|---|---|---|
| 2,529,591 | 11/1950 | Bloch | 260—2 H |
| 2,622,056 | 12/1952 | De Coudres et al. | 260—33.8 U |
| 2,825,709 | 3/1958 | Sturm | 260—33.8 U |
| 3,034,939 | 5/1962 | Newkirk et al. | 260—33.8 U |
| 3,232,895 | 2/1966 | Klein et al. | 260—33.8 U |
| 2,474,881 | 7/1949 | Young et al. | 280—33.6 AO |
| 3,202,729 | 8/1965 | Roberts | 260—887 |

OTHER REFERENCES

Rostler et al.—Ind. Eng. Chem. 47, 1069–1076 (1955).

Doolittle—"Technology of Solvents and Plasticizing," Wiley, New York, 1954, pp. 1006–1007.

Hackh's Chemical Dictionary, 3rd ed., McGraw-Hill, New York, 1944, p. 33.

Materials and Compounding Ingredients for Rubber and Plastics, Rubber World, 1965, New York, received Patent Office June 1, 1965, pp. 300–302. TS 1890 I 53.

ALLAN LIEBERMAN, Primary Examiner

U.S. Cl. X.R.

260—31.2 MR, 32.8 A, 32.8 R, 33.6 AQ, 33.6 PQ, 887, 889, 897